United States Patent [19]

Sauer et al.

[11] 3,977,902

[45] Aug. 31, 1976

[54] FUEL CELL SYSTEM

[75] Inventors: Hans Sauer, Glashutten, Taunus; Dieter Spahrbier, Frankfurt-Rodelheim, both of Germany

[73] Assignee: Varta Batterie Aktiengesellschaft, Hannover, Germany

[22] Filed: Apr. 26, 1974

[21] Appl. No.: 464,510

[30] Foreign Application Priority Data

Apr. 26, 1973 Germany............................ 2321087

[52] U.S. Cl............................................ 136/86 R
[51] Int. Cl.².......................................... H01M 8/04
[58] Field of Search................ 136/86 A, 86 E, 159, 136/160

[56] References Cited

UNITED STATES PATENTS

| | | | |
|---|---|---|---|
| 668,838 | 2/1901 | Lavison............................ | 136/86 A |
| 916,321 | 3/1909 | Joel.................................... | 136/159 |
| 2,584,117 | 2/1952 | Elrod.................................. | 136/159 |
| 3,255,048 | 6/1966 | Comanor et al..................... | 136/159 |
| 3,546,021 | 12/1970 | Craig................................. | 136/86 A |
| 3,635,764 | 1/1972 | Setser................................ | 136/86 E |
| 3,679,486 | 7/1972 | Proell................................ | 136/86 E |

Primary Examiner—John H. Mack
Assistant Examiner—H. A. Feeley
Attorney, Agent, or Firm—Weiser, Stapler & Spivak

[57] ABSTRACT

An assembly of fuel cells, enclosed in a container, is immersed in a tank holding the electrolyte. Operating gas is used to produce electrolyte circulation through the cells.

15 Claims, 9 Drawing Figures

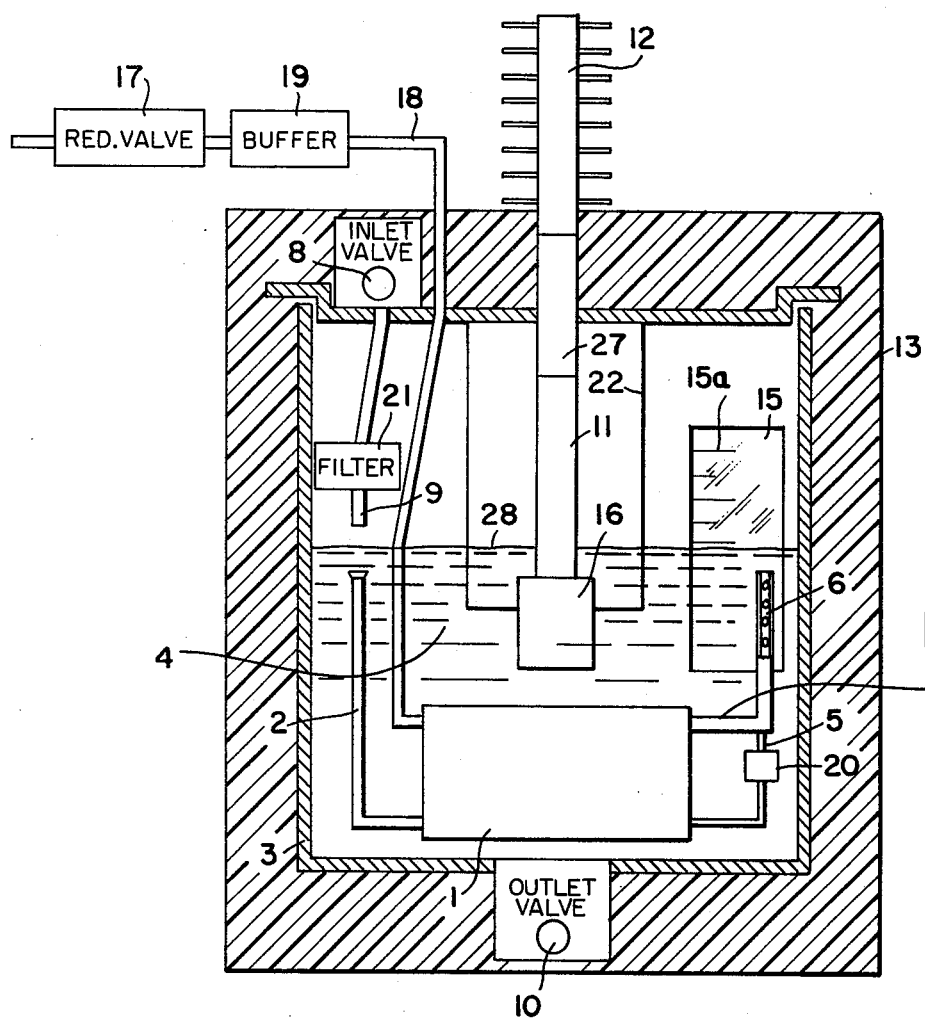
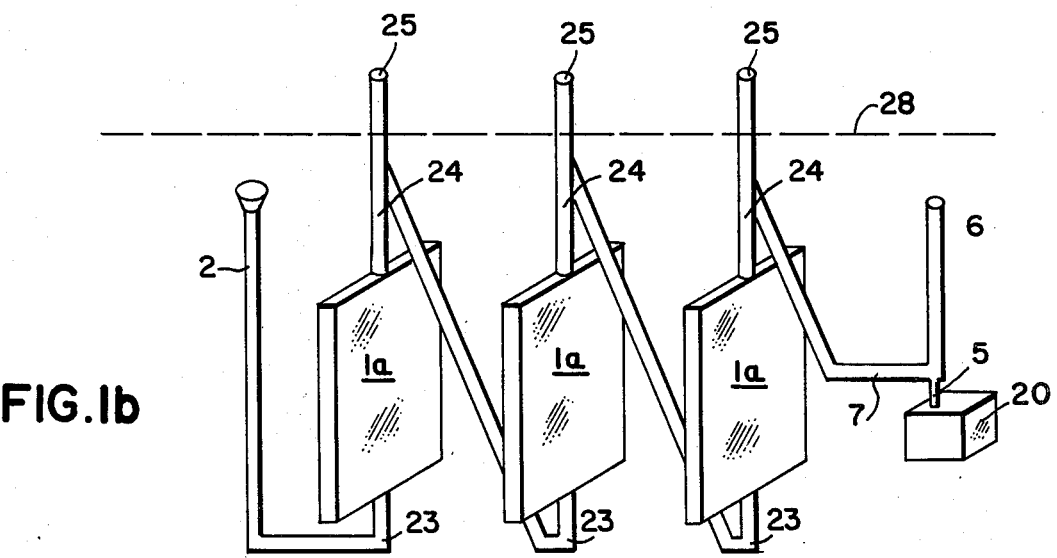

FUEL CELL SYSTEM

This invention relates to a fuel cell system of comparatively low power output, designed for ambient temperature operation, and utilizing gas-driven circulation of the aqueous electrolyte.

In low power fuel cell systems subject to low current demand, there does not exist the problem of having to provide rapid circulation of the electrolyte for heat dissipation. In systems of this type, there is possibility of dissipating the heat which is produced through the fuel cell housing to the ambient.

Low power fuel cells capable of long maintenance free operating periods are especially desirable as the energy source for electronic and/or electromechanical devices to be operated in remote areas. When coupled to an appropriate secondary battery the continuous low/power output of the fuel cell system can also be transformed into a discontinuous high power output. This high power output may serve to operate electric motors, transmitting stations or light signals etc. having a power requirement e.g. 100-fold compared to the continuous low/power output. In such an application, the power source has to be capable of functioning without maintenance for an extended period of time, such as several months. Such systems should therefore be encumbered with a minimum of auxiliary devices in order to provide the necessary reliability for extended operation. Although, in such systems, rapid electrolyte circulation is not required, a certain electrolyte circulation rate must nevertheless be maintained, to insure removal of the reaction products from the fuel cell battery. Furthermore, in fuel cell systems operating on a liquid fuel dissolved in the electrolyte, there exists the further requirement that the electrolyte circulation shall also provide the fuel supply.

Energy saving techniques for producing gas and electrolyte circulation in fuel cell-batteries without electromechanical components are known, e.g. by a gas lift pump.

For electrolyte circulation, a so-called gas lift can be used, e.g. hydrogen or oxygen and a suitable processor connected ahead of it. The lifting gas enters from below into a distribution duct, one branch of which is connected to the cell, while the other is connected to a reservoir positioned above the cell. The lifting gas entrains a portion of the liquid and thereby continually fills the reservoir from which the electrolyte flows back into the cell (See FIG. 1a).

By using gas driven circulation of the electrolyte, the reliability of low-maintenance fuel cell systems is enhanced. However, in these known arrangements there still remains the possibility of a leak in the electrolyte circulating system, because the electrolyte continues to be piped through discrete structural elements, such as conduits, fuel cell and reservoir.

Accordingly, it is an object of the present invention to provide a low-maintenance, leak proof fuel cell system.

This and other objects which will appear are achieved, in accordance with the invention, by positioning the enclosed fuel cells and the devices needed to accomplish the gas driven electrolyte circulation within the electrolyte storage tank below the surface of the liquid contained therein. This immersion may be total or partial, as hereinafter explained. The shape of the fuel cells, as determined by their functions, creates interstices which can be used for electrolyte storage, thereby contributing to a compact, space-saving construction of the fuel cell system. Even when the electrolyte circulation rate is low, the entire stored electrolyte is available as heat sink to provide uniform thermal conditions.

Fuel cell system of this type can be constructed on the basis of $H_2/O_2$ elements, as well as on the basis of cells using alcohol dissolved in an electrolyte as fuel. In the operation of $H_2/O_2$ fuel cell systems the alkaline electrolyte becomes enriched with water which constitutes the reaction product. In fuel cell systems which use alcohol dissolved in electrolyte as fuel, methanol/$O_2$ elements are frequently used. The electrolyte fuel mixture in the electrolyte tank becomes enriched, in the case of alkaline electrolytes with reaction products such as formaldehyde, formiate and carbonate (See FIG. 1a).

For further details, reference is made to the description which follows in light of the accompanying drawings wherein FIGS. 1a, 2, 4 and 7 show in simplified diagrammatic form, several different fuel cell systems embodying the invention;

FIG. 1b shows in schematic form, certain details of the fuel cell assembly which forms part of FIG. 1a;

The same reference numerals are used in the different figures to designate similar elements.

Figure 2:
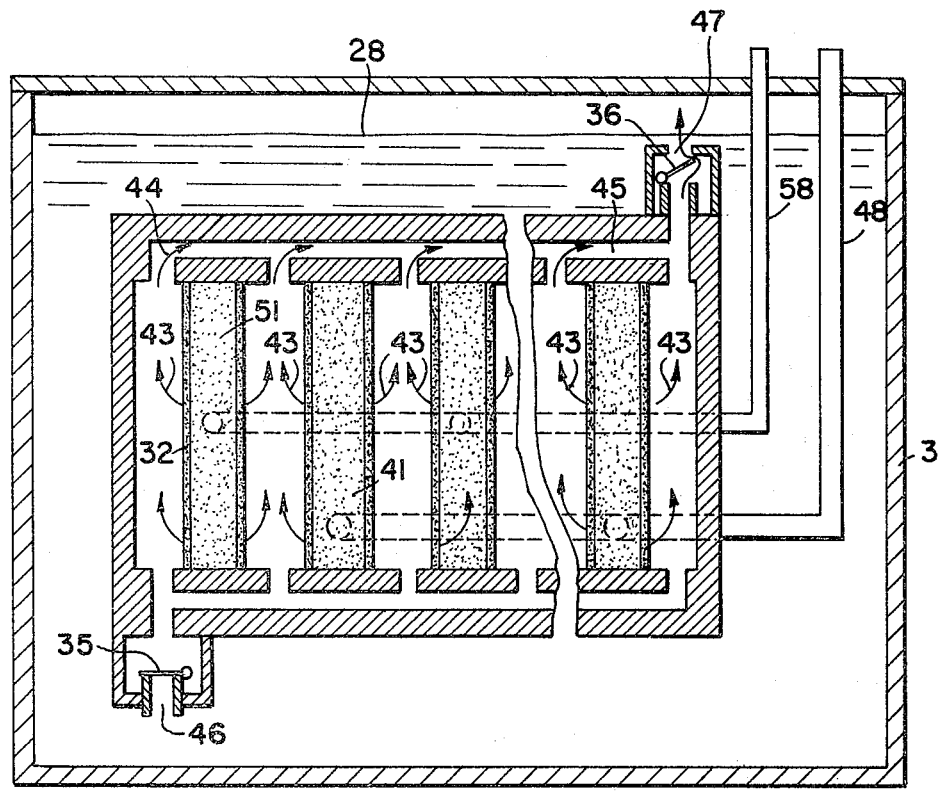

Referring to FIGS. 1a and 1b, these show a fuel cell system which is thermally insulated and provided with a heat exchanger, and whose electrolyte is circulated by means of a gas lift.

The electrolyte enters the assembly of fuel cells, which is collectively designated by reference numeral 1 in FIG. 1a, through electrolyte suction pipe 2. As shown in FIG. 1b, pipe 2 leads to the electrolyte inlet 23 of the first of several individual fuel cells 1a. This electrolyte flows through the fuel cell 1a from the bottom toward the top, so that developed gas bubbles, and particularly oxygen bubbles, are removed from the fuel cell by virtue of their direction of flow and buoyancy. These gas bubbles reach the vent opening 25 through electrolyte outlet 24 and are there expelled. The electrolyte flows through conduit 26 to the next fuel cell 1a. The several fuel cells are traversed successively by electrolyte in the same direction. From the electrolyte outlet 24 of the last traversed fuel cell, the electrolyte flows through pump conduit 7 into the riser 6 of the gas lift (see both FIGS. 1a and 1b). Gas, namely inert gas from the fuel cells, reaches the gas lift riser 6 through controllable valve 20 and conduit 5. Oxygen is supplied to fuel cell assembly 1 through pipe 18.

EXAMPLE 1:

$H_2/O_2$ fuel cell battery, 5 watt capacity

One liter 6nKOH is used as the electrolyte. The system produces about 3 ml $H_2O$/h reaction water. Dilution of the electrolyte to 1nKOH is permissible. It is therefore possible to produce about 5 liters of $H_2O$, i.e. to derive from the system about 8.5 kWh. For this, the electrolyte leaving the battery must be circulated fast enough to prevent its concentration from falling below 1n. This leads to a required circulation rate V of $V > 3.5$ cm$^3$/h.

To operate the gas lift (assuming comparable inert gas content for $H_2$ and $O_2$) the $H_2$ conduit is used. If the purity of the hydrogen is 97%, about 100 cm$^3$/h of inert gas must be expelled. With this quantity of gas about 500 cm$^3$/h of electrolyte can be circulated at room temperature, so that the circulation rate exceeds by more than 140 times the required circulation rate V. In an $H_2/O_2$ fuel cell it is desirable to omit the electrolyte suction pipe 2,, so that the electrolyte directly enters the electrolyte inlet of the fuel cell battery. The reason is as follows. Because of its higher specific gravity, the more concentrated solution is always present at the bottom of electrolyte tank 3. Therefore, it is this more concentrated solution which is always supplied to the battery.

EXAMPLE 2

Methanol $O_2$-fuel cell battery, 5 watt capacity

This utilizes a methanol-alkali mixture of the composition

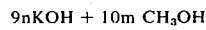

This mixture has an energy storage volume of 1.5 l/kWh. For continuous 5 watt operation, at least 7.5 cm$^3$/h of alkali-fuel mixture must be supplied to the fuel cell battery. If oxygen of 97% purity is used, aboout 50 cm$^3$/h of inert gas are expelled through inert gas valve 20. This quantity of gas is capable of circulating 250 cm$^3$ of fuel-alkali mixture, which is 33 times as much as required.

During the depletion process, the specific gravity of the alkali/fuel mixture rises from 1.26 to about 1.30. Therefore, as experimentally verified, it is essential to provide an electrolyte suction pipe 2 whose opening is close below the liquid surface, so that it is always the mixture of lower specific gravity which flows into the fuel cell battery.

At a power level of 5 watts, recharging must be carried out every 3 months. This involves changing the 20-liter, 200 atu $O_2$ bottle, and the methanol/alkali mixture. For an $H_2/O_2$ system, an $H_2$ bottle must be changed in addition to the $O_2$ bottle and the electrolyte.

To carry out this charging operation, a pipe is inserted into the open end of outlet valve 10, so that the depleted methanol/alkali mixture can flow through a hose into a receptacle. Since the open ends of pipes 2 and 6 lie above fuel cell assembly 1, the methanol/alkali mixture then working in the fuel cell battery is not drained.

Fresh methanol/alkali mixture is pumped into the electrolyte space through electrolyte inlet valve 8. Pipe 9 is so placed that its open end is directly above the open end of pipe 2. The depletion methanol/alkali mixture is then forced out of fuel cell assembly 1 through riser pipe 6 by the kinetic energy of the pumped-in liquid. To prevent foreign matter from being introduced into the system, a filter 21 is preferably provided in pipe 9.

To keep the system functioning during exchange of the oxygen pressure bottle, a buffer storage 19 is provided behind pressure-reducing valve 17.

To monitor the available stored energy, a window 15 with scale markings 15a is provided. Since the volume of the fuel/alkali mixture increases by about 20% during depletion, surveillance of liquid level 28 makes it possible to determine the degree of discharge. Similarly, a high-pressure manometer can be used to read the available oxygen remaining in the $O_2$ storage bottle.

In a particularly desirable form of the invention, riser pipe 6 of the gas lift is located directly behind window 15, so that gas lift functioning can also be visibly monitored. The output of the methanol/oxygen system is comparatively strongly temperature-sensitive. Constant power output therefore requires that the operating temperature remain as constant as possible. For trouble-free operation at low ambient temperatures (e.g. $-15°C$) thermal insulation 13 must be provided for the fuel cell system. On the other hand, at ambient temperatures above $+25°C$ thermal insulation 13 must be removed, or the temperature may rise above $60°C$. Under such conditions a high evaporation rate of the methanol would prevail, with consequent reduction of the available power output. To obtain, in spite of this, a maintenance-free system which works during summer and winter months, the fuel cell system is equipped with a tube-type heat exchanger 11. This heat exchanger 11 has the property of becoming thermally conductive within a relatively narrow temperature range. This heat exchanger includes an evaporator 16 and a condenser 12, connected by a pipe 27 of low heat conductivity. The operating principle of the heat exchanger is as follows. The evaporator 16 is supplied with heat energy at a temperature at which the heat transport fluid contained within it boils. Condensation of this fluid takes place in condenser 12, thereby surrendering its heat of condensation to the outside. The condensed fluid then flows back into the evaporator portion. For heat transfer, isopentane (2-methyl butane) may be utilized. This fluid boils and condenses at atmospheric pressure in the temperature range of $+27°$ to $+28°C$. By using a 20 cm thick thermal insulation of neoprene-type synthetic rubber, in conjunction with the above-described exchanger 11, a 5 watt methanol/oxygen system can be achieved, whose internal temperature varies by only about $8°C$ ($26°C$ to $34°C$) in the face of ambient temperature variations from $25°C$ to $-15°C$ (See German Patent Disclosure Auslegeschrift No. 1,671,966).

If it is also desired to maintain substantially constant operating temperature of the load to which the electrical energy so produced is supplied, that load may be placed within housing 22, which is in heat-communicating relationship with electrolyte 4.

It will be noted that within tank 3, there is not required any electro-mechanical devices, mechanical pumps, or other apparatus of questionable reliability.

Figures 3A, 3B:
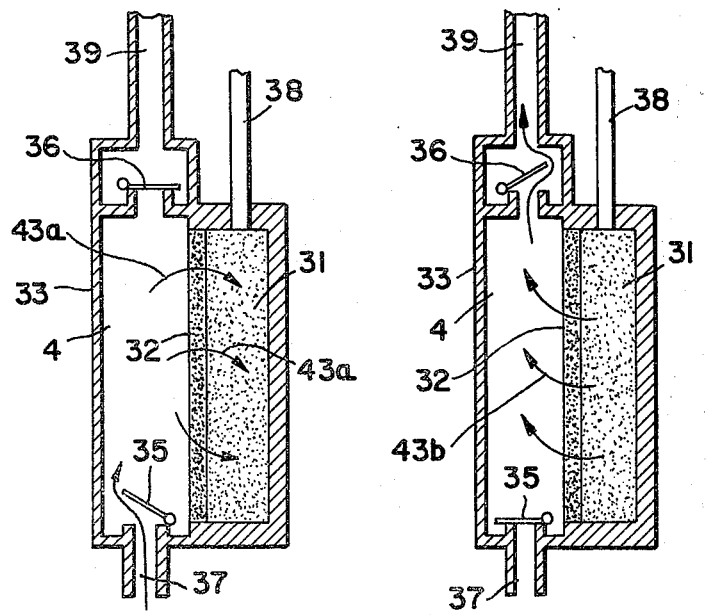
FIGS. 3a and 3b show the fuel cell element of a system similar to that of FIG. 2, at two different stages in its operating cycle.

FIG. 2, to which reference may now be had, shows a fuel cell system equipped with gas diffusion electrodes, and whose electrolyte is circulated by variations with time of the supply gas pressure. In FIGS. 3a and 3b, this circulation princiiple is futher elucidated. The apparatus shown in these figures includes a gas diffusion electrode 31 having a cover layer 32 of high capillary pressure, and a chamber 33 containing electrolyte 4. Two valves 35 and 36 are also provided.

This apparatus works as follows.

The dry electrode is brought into contact with electrolyte 4, which it draws in through capillary action, as shown by arrows 43a in FIG. 3a. This causes inlet valve 35 to open, while outlet valve 36 remains closed. Thus fresh electrolyte is drawn from the storage vessel (not shown) through electrolyte duct 37. When this process ends, valve 35 closes, under the influence of gravity or spring pressure. At that time, the gas pressure provided through duct 38 has its lowest value. When gas pressure supplied via duct 38 is increased, the electrolyte flows out of electrode 31 in the direction shown by arrows 43b in FIG. 3b. In so doing, it opens valve 36. At the conclusion of this process, valve 36 closes. Electrolyte 4 is then pumped through conduit 39 into the receptor vessel, which can also be the storage vessel. If the pressure applied through duct 38 is oscillating with a predetermined pressure amplitude, then the system shown in FIGS. 3a and 3b functions as a fluid pump. It is important to match the duration of the period of increased pressure to the period required to force the electrolyte out of at least 70 to 80% of the porous system. The same is true for the duration of the period of reduced pressure. This period should be long enough that the electrolyte can penetrate the porous system to the extent of 70 to 80%.

Janus electrodes are especially suitable for this pumping process. In response to rythmic pressure variations in gas supply, a Janus electrode can draw in or expel electrolyte from both sides facing the electrolyte chamber.

FIG. 2 shows an arrangement comprising a plurality of porous electrodes such as might be contained in a fuel cell battery. Electrodes 41 may be oxygen electrodes and electrodes 51 hydrogen electrodes. The oxygen electrodes are interconnected by means of oxygen conduit 48, while the hydrogen electrodes are correspondingly interconnected by hyrdrogen conduit 58. If the pressure in conduit 48, for example, is increased, the electrolyte flows on both sides out of all oxygen electrodes 41 into electrolyte chambers 43. The electrolyte then flows through connecting channels 44 into outlet manifold 45, causing valve 36 to open. Through electrolyte outlet 47, the electrolyte flows into the electrolyte tank. If the gas pressure for hydrogen conduit 58 is increased, the corresponding result is obtained.

Fresh electrolyte is drawn in through electrolyte inlet 46, in accordance with the mode of operation described in connection with FIGS. 3a and 3b. Note that it is immaterial whether the gas pressure is reduced in conduit 48, in conduit 58, or in both of them. However, for satisfactory pumping action it is important that, if the operating pressure of both gases varies, their respective pressure increases and decreases occur in synchronism.

Figure 4:
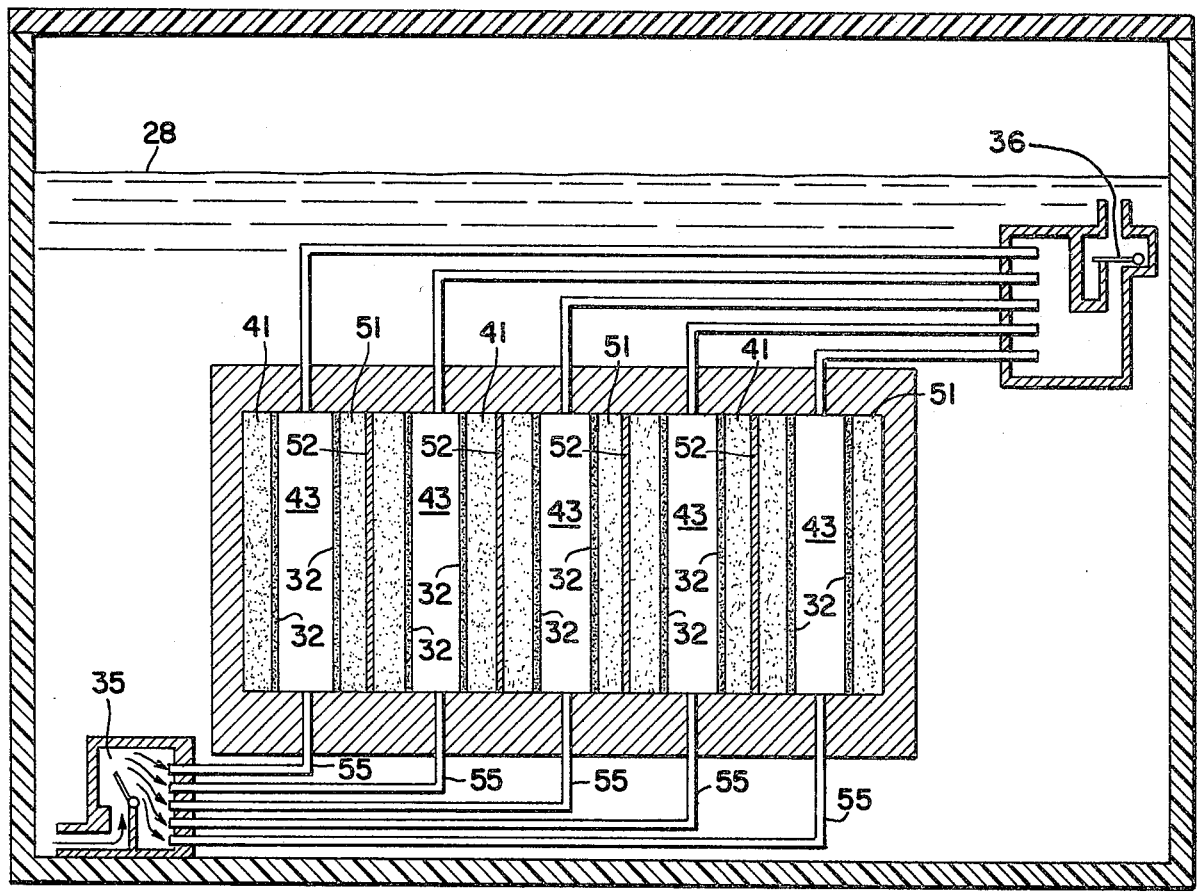

If, for the production of higher battery voltage composite electrodes are utilized, common electrolyte inlet and outlet manifolds should not be used. For that case, an arrangement according to FIG. 4 may be used.

That figure shows a fuel cell with oxygen electrodes 41 and hydrogen electrodes 51. These are common electrodes having a insulating layer 52. In addition, the fuel cell system contains electrolyte chambers 43, each electrolyte chamber having its own electrolyte conduit 55 leading to inlet valve 35, and its own electrolyte conduit 56 leading to outlet valve 36. By using electrolyte conduits 55 and 56 of appropriate lengths a significant reduction of parasitic currents can be achieved. Furthermore, each electrolyte chamber has its own independent pumping system which functions whenever periodic pressure variations are produced in at least one of the operating gases.

Figure 5:
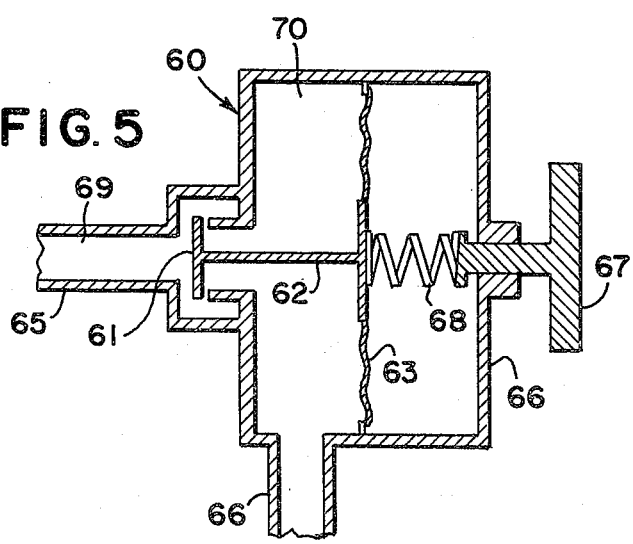
FIG. 5 shows a specific form of gas pressure varying valve suitable for use with certain systems embodying the invention.

FIG. 5 shows a modified pressure reducing valve which may be used to produce the oscillating gas pressure for effecting electrolyte circulation.

This pressure oscillating valve 60 comprises a cutoff valve 61 connected to membrane 63 by connecting rod 62. These elements are positioned in housing 64. Housing 64 has an inlet 65 through which gas under high pressure is supplied. The pressure-controlled gas is supplied to the fuel cell through connection 66. At the start of operation, spring 68 is placed under pressure by means of thumb screw 67, so that valve 61 is opened via membrane 63. Under these conditions, gas flow at a pressure $p_1$ from space 69 into space 70. As soon as the pressure $p_2$ reaches a value high enough to overcome the opposing force of spring 68, valve 61 closes. Under these conditions there is produced an additional closing force due to the product $p_1 \times F_1$, where $F_1$ is the closing surface of valve 61. When a gas consuming device is connected to connection 66, the pressure $p_2$ in space 70 decreases, so that the opposing force acting upon spring 68 also decreases. As soon as this opposing force in space 70 has decreased by the amount $p_1 \times F_1$, the valve suddenly reopens, and the process described above begins anew. The pressure amplitude in chamber 70, which is produced in this manner in response to gas consumption through connection 66, depends primarily on the surface ratio $F_2 : F_1$ ($F_1$ where is the closed surface area of valve 61 and $F_2$ is the surface area of membrane 63). The smaller this ratio, the greater the resultant pressure variation.

Figure 6:
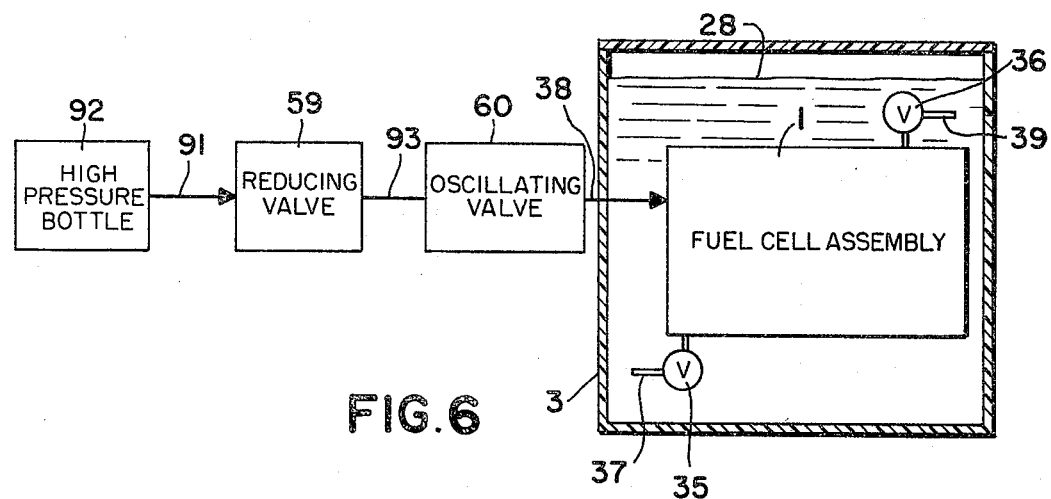
FIG. 6 shows in schematic form a fuel cell system embodying the invention and utilizing the valve of FIG. 5.

To obtain a fixed pressure variation, it is desirable to maintain constant the pressure $p_1$ in chamber 69. If valve gas pressure bottle is used as the gas supply, an additional reduction valve must be employed in order to maintain this pressure $p_1$ constant. This leads to the schematic diagram of an embodiment of the invention shown in FIG. 6. It shows a high pressure bottle 92 connected via conduit 91 to pressure reducing valve 59, which provides constant inlet pressure $p_1$ for pressure oscillating valve 60. Reducing valves 59 and 60 are connected through conduit 93. The gas consuming fuel cells 1 are connected to reducing valve 60 through conduit 38. Reducing valave 60 produces a varying working pressure for the fuel cell assembly 1, the frequency of which depends on the gas consumption rate of fuel cell assembly 1. Conduit 37 represents the electrolyte inlet channel, conduit 39 the electrolyte outlet channel of fuel cell assembly 1. When the gas pressure falls, the back pressure valve 35 opens and valve 36 closes, as a result fresh electrolyte, or rather fresh electrolyte fuel mixture being drawn in through conduit 37. When the gas pressure rises valve 35 closes and valve 36 opens. As a result, the solution enriched with reaction product flows back into electrolyte tank 3.

Figure 7:
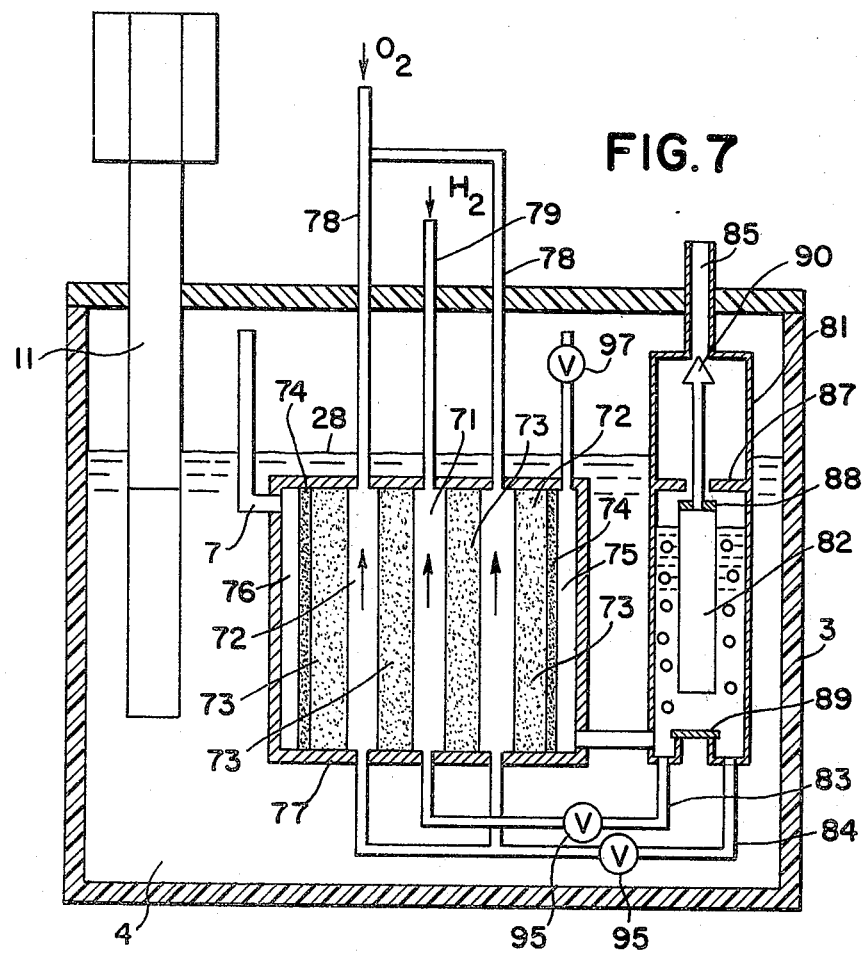

FIG. 7 shows a fuel cell battery as disclosed in more detail in German Pat. No. 1,496,241. Its electrolyte flow takes place at right angles to the gas flow. This cell contains bi-porous hydrogen working layers 71 and bi-porous oxygen working layers 72 separated by asbestos layers 73. At both head ends of the cell there are coarsely porous collector layers 74. The entire package of electrodes and diaphragms is encapsulated in an epoxy resin enclosure 77. The reaction gases are introduced at the edges of the electrodes through conduits 78 and 79, so that the gases flow uniformly parallel to the asbestos diaphragms 73 within working layers 71 and 72. The electrolyte is supplied to the fuel cells from displacement pump 81 through electrolyte supply conduit 2. To prevent the permissible working pressure of the electrolyte from being exceeded or gases from accumulating in the electrolyte chamber, that electrolyte chamber 75 is connected at its highest point with a pressure relief valve 97. After flowing through the fuel cells, the electrolyte returns to electrolyte tank 3 through electrolyte chamber 76 and outlet conduit 7.

A mixture of oxygen and inert gas, and a mixture of hydrogen and inert gas flow through outlet conduits 84 and 83 provided with needle valves 95 into the lower part of displacement pump 81 provided with back pressure valve 89. Vertically displaceable float 82 is subject to the buoyancy of the electrolyte which surrounds it, within the displacement pump. Moreover, a magnetic field is produced between a ring shaped holder magnet 88 on the float and a nickel ring 87 attached to the upper portion of the displacement pump, and this field tends to hold the float in its upper position. Valve 90 attached to float 82 closes off the gas outlet 85 of the displacement pump when the float is in its upper position.

Through continued supply of the gas mixture an increasing gas volume forms below the closing valve 90, which forces the electrolyte out of the interior of the displacement pump and causes it to be supplied to the fuel cells via the electrolyte inlet 2.

The upward force exerted upon the float is thus progressively reduced. When the forces operating on the float due to buoyancy and the magnetic field fall below the force of gravity, the float drops. Through dropping of the valve 90, the gas outlet 85 of the displacement pump is opened permitting the accumulated gas to escape. Through back pressure valve 89, fresh electrolyte flows into the interior of the displacement pump and carries the float back to its upper position. Thus a new working cycle can start.

To achieve the most uniform possible operating temperature in the face of varying ambient temperatures, electrolyte tank 3 is preferably thermally insulated and provided with a tube type heat exchanger 11.

It should be noted that, in all cases, where a gas lift pump is used it is preferable that the fuel cell batteries be completely immersed in the electrolyte. Partial immersion of the fuel cell battery is permissible and also provides a functioning system, particularly when a displacement pump as described above is used. However, it is necessary that the pump itself is adequately immersed in the electrolyte for the system to be operative.

The system of the invention is noteworthy for its compactness, efficiency, reliability and suitability for several applications where the conventional systems are not adequately satisfactory.

We claim:

1. In a fuel cell system comprising a plurality of fuel cells responsive to the presence of liquid electrolyte and operating gas to produce electrical energy, the improvement which comprises:
   a tank adapted to be at least partly filled with said electrolyte;
   a container enclosing said fuel cells and positioned within said tank so as to be at least partly immersed in the electrolyte;
   electrolyte inlet means to the fuel cells within the container, said inlet means leading from the tank into the container and having its intake submerged below the level of the liquid electrolyte;
   electrolyte outlet means from the fuel cells within the container, said outlet means leading from the container into the tank;
   means for supplying operating gas from outside the tank to the fuel cells in the container;
   gas outlet means from the container for the residue of the said gas supplied to the fuel cells; and
   means supplied with the said gas residue from the gas outlet means for utilizing the residue to produce flow of the liquid electrolyte through the electrolyte inlet means into the fuel cells within the container and through the electrolyte outlet means from the fuel cells back into the tank.

2. The system of claim 1, wherein said container is completely immersed in said electrolyte.

3. The system of claim 1 wherein the gas supplying means comprises means for varying the pressure of the gas supplied to said fuel cells, thereby to assist said liquid electrolyte flow.

4. The system of claim 3, wherein each fuel cell includes a porous electrode and an adjoining electrolyte space, and means for supplying said gas to said porous electrode, so that gas pressure variations cause said electrolyte to be alternately drawn into and expelled from said porous electrode.

5. The system of claim 3, further comprising inlet and outlet valve means for said electrolyte space, responsive to reduced gas pressure to open said inlet means and to increased pressure to open said outlet means.

6. The system of claim 3, comprising a pressure oscillating valve constructed and arranged to produce said gas pressure variations.

7. The system of claim 1 wherein said electrolyte flow producing means comprises an intermittently operating displacement pump connected to be supplied with the operating gas residue and with the liquid electrolyte.

8. The system of claim 7, wherein said pump comprises a float whose excursions are activated by said liquid electrolyte, a valve activated by said float, and magnet means for selectively strengthening the tendency of said float and valve to remain at one end of their excursions.

9. The system of claim 4, wherein said porous electrode is a gas diffusion electrode having a cover layer of high capillary pressure separating said gas diffusion electrode from said electrolyte space.

10. The system of claim 9, wherein said gas and electrolyte flow through said bi-porous electrode in mutually perpendicular directions.

11. The system of claim 6, wherein said valve comprises two chambers separated by a diaphragm, one of said chambers having an inlet and an outlet for said gas, a valve on said inlet urged toward closure by gas approaching said inlet, a variable pressure spring urging said valve toward openness and controlled by displacement of said diaphragm.

12. The system of claim 1, wherein the electrolyte flow producing means comprises a gas lift connected to be supplied with the operating gas residue and with the electrolyte from the electrolyte outlet means.

13. The system of claim 1, wherein the different fuel cells are connected within the container so that the liquid electrolyte flows through them successively.

14. The system of claim 1, wherein the different fuel cells are connected within the container so that the liquid electrolyte flows through them simultaneously.

15. The system of claim 14, wherein each fuel cell has an electrolyte inlet and an electrolyte outlet, and further comprising first and second manifolds respectively connecting all the inlets and all the outlets.

* * * * *